No. 675,179. Patented May 28, 1901.
C. WACKER.
RENDERING APPARATUS.
(Application filed Feb. 4, 1901.)
(No Model.) 2 Sheets—Sheet 1.
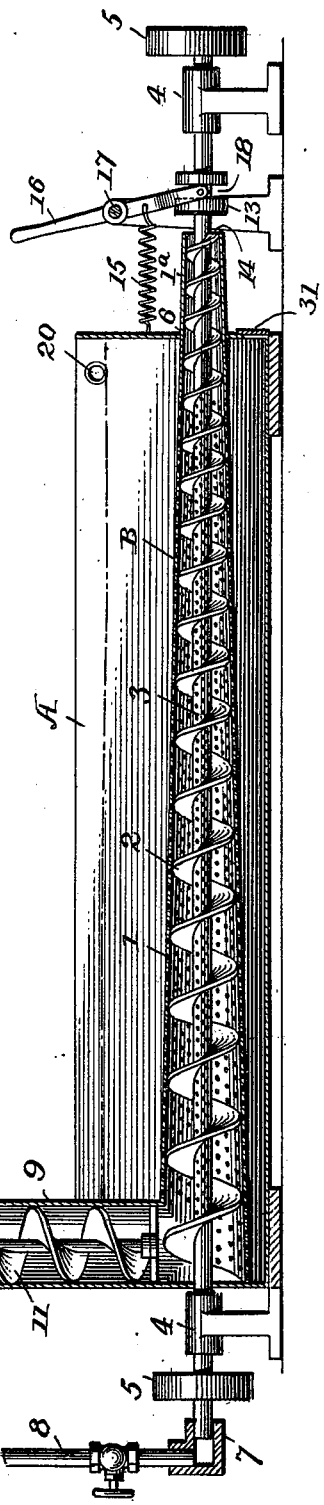
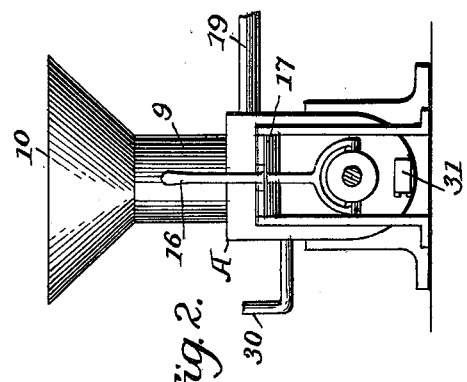
Inventor
Charles Wacker
By Watson & Watson
Attorneys
Witnesses
J. G. Hinkel
C. W. Clement No. 675,179. Patented May 28, 1901.
C. WACKER.
RENDERING APPARATUS.
(Application filed Feb. 4, 1901.)
(No Model.) 2 Sheets—Sheet 2.
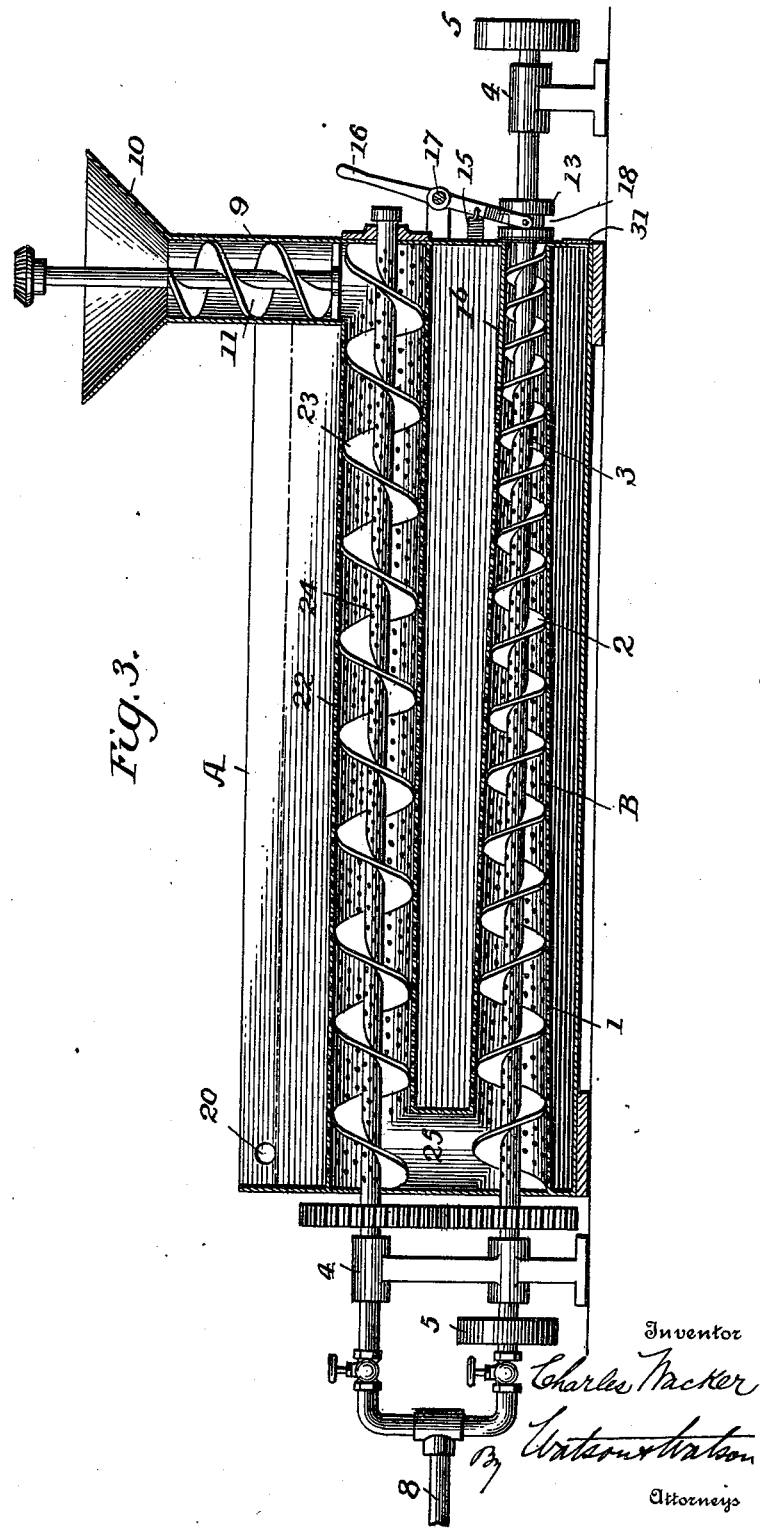

UNITED STATES PATENT OFFICE.

CHARLES WACKER, OF BALTIMORE, MARYLAND.

RENDERING APPARATUS.

SPECIFICATION forming part of Letters Patent No. 675,179, dated May 28, 1901.

Application filed February 4, 1901. Serial No. 45,918. (No model.)

*To all whom it may concern:*

Be it known that I, CHARLES WACKER, a citizen of the United States, residing at Baltimore, in the State of Maryland, have invented certain new and useful Improvements in Apparatus for Cooking and Extracting Oil from Fish, &c., of which the following is a specification.

The purpose of my invention is to provide apparatus for extracting oil from fish or other material by a continuous process without rehandling; and the invention comprises means for passing the material through a tank of heated water under gradually-increasing pressure, whereby the oil is separated from the material as fast as it is liberated by the heat, and the hot water is allowed to come immediately in contact with the parts of the material from which the oil is liberated, thus facilitating the cooking of the material and the liberation of the remaining oil. The oil floats to the top of the water as soon as it is extracted and is conducted away, and hence does not impede the cooking operation and the extraction of the remaining oil. After the oil is expelled from the material the latter is forced out of the tank in a compact moist state, ready to be placed in suitable driers and manufactured into fertilizers.

The apparatus may be used for treating raw material or material which has been partly or wholly cooked in separate vessels, as well as for treating material from which a large part of the oil has been extracted by other processes. In the latter case the treated material may be passed through my apparatus and the remaining oil extracted.

In the accompanying drawings, which illustrate the invention, Figure 1 is a longitudinal section through the apparatus. Fig. 2 is a view of the delivery end of the tank shown in Fig. 1, and Fig. 3 is a longitudinal section through a modified form of apparatus.

Referring to Figs. 1 and 2 of the drawings, A indicates a tank or vessel, made long and preferably narrow, as shown, and arranged longitudinally near the bottom of said tank is a conveyer-press B, comprising a tapering or conical casing 1, extending from end to end of the tank, and a correspondingly-tapering screw 2, arranged within said casing and secured upon a shaft 3, the latter extending through the ends of the tank and being mounted in suitable bearings 4. Driving-wheels 5 are arranged upon the opposite ends of the shaft. The conical casing, as shown in Fig. 1, is perforated throughout its length in the interior of the tank, and its smaller end 1$^a$ projects through an opening 6 in one end of the tank. The part 1$^a$ is not perforated. The shaft 3, as shown in said figure, is made hollow and perforated throughout the portion lying within the tank, and steam is admitted to said shaft through the stationary coupling-piece 7, connected with the steam-pipe 8. A feed-pipe 9 is connected to the larger end of the conveyer-press casing and provided with a suitable hopper 10, and a screw conveyer 11, mounted upon a vertical shaft 12, is arranged within said pipe and adapted to force the material to be treated down into the conveyer-press casing.

Upon the shaft 3 is arranged a sliding valve 13, which is adapted to fit over and close the discharge-opening 14 at the delivery end of the conveyer-press casing. This valve fits closely around the shaft and is movable longitudinally thereon, and it is normally pressed toward the opening 14 by a spring 15, attached to a lever 16, the latter being pivoted at 17 and having a forked end fitting within an annular recess 18, formed on the valve. When the tank is filled with water and the apparatus is not in operation, this valve closes the mouth of the conveyer-press casing and prevents the escape of water; but it may be withdrawn at any time by means of the handle 16. An opening 20 is formed near the top of the tank, through which the oil, which floats to the top of the water, will pass off through a pipe 19. Water is supplied to the tank through an inlet-pipe 30, below the surface of the liquid.

In operation the fish or other matter is fed into the hopper 10 and is forced downward through the water into the conveyer-press casing by means of the conveyer 11. Steam is admitted to the hollow shaft through the pipe 8, and the material under treatment is carried along by the screw 2, becoming gradually more compact as it passes toward the smaller end of the conveyer-press. Steam from the perforated shaft passes outward through the surrounding mass of material, heating the water and cooking and disintegrating the material. The tank is quite long, and the speed of the screw is regulated so as to allow plenty of time for the thorough cooking of the material before it reaches the delivery end of the casing. As the cooking and compressing process goes on the oil is liberated and floats to the top of the water, from whence it is continually skimmed off through the opening 18. In the larger end of the casing it will be seen that the compression of the material is slight and that the compression gradually increases as the material passes along toward the smaller end, where it forms a compact plug and prevents the escape of water. In the treatment of fish a large percentage of the oil may be liberated with little pressure when the fish is properly cooked by the hot water and steam. As oil and water do not mix, it is important to expel the oil as fast as it is liberated, so that the water can permeate the mass and come in contact with the portions of the material from which the oil has been liberated. By gradually compressing the fish under the heated water as the material passes along in the conveyer the oil is expelled as soon as it is liberated by the heat, and the hot water is allowed to come in contact with the parts from which it was previously excluded by the expelled oil. This gradual compression in the heated water therefore expels the oil as fast as it is liberated by the heat and hastens the cooking operation and the liberation of the remaining oil. Hence in passing through the screw-press the oil will be extracted before the material reaches the outlet end of the tube. The action with offal or other animal matter would be the same. When the material reaches the delivery end of the casing, it forms a compact plug, which prevents the escape of water from the tank, and the pressure of the material upon the valve 13 forces the latter away from the end of the casing, so that the material may drop out. The valve will be held away from the mouth of the casing as long as the material is being forced through, and when the machine is out of operation the valve seats upon the end of the casing and prevents the escape of water from the tank.

In Fig. 3 I have shown a modified form of apparatus in which the same result may be accomplished with a shorter tank where space is limited or in which the cooking operation may be prolonged before compression of the material if the tank is extended. In this figure I arrange a conveyer in the upper portion of the tank comprising a perforated cylinder 22 and a screw 23, mounted upon a perforated hollow shaft 24, the latter extending through the cylinder. The feed-hopper 10 is arranged at one end of the cylinder, and a duct 25 is arranged at the opposite end, said duct leading to the larger end of the conveyer-press B in the lower part of the tank. This conveyer-press may be the same as that shown in Fig. 1; but in Fig. 3 it is shown with its smaller end cut off close to the end of the tank, the valve 13 fitting over the opening. When the conveyer-press is thus arranged, a portion $1^b$ of the smaller end of the casing, adjacent to the end of the tank, is preferably not perforated, as it is desirable to exclude the water from the material near its point of delivery in order to retain the water in the tank. The shafts of the upper and lower conveyers may be separately driven or geared together, as shown, and steam may be admitted to each shaft through a suitable supply-pipe 8. In the operation of this form of apparatus the material first passes along through the upper conveyer, where it is partially cooked, and thence into the conveyer-press in the bottom of the tank, where the operation of extracting the oil proceeds in the same manner as described in connection with Fig. 1.

While I prefer to admit steam to the tank through the hollow shaft or shafts, I may supply the heat in other ways—as, for instance, by means of steam-coils arranged within the tank. The shaft may be perforated for only a part of its length within the tank or throughout the whole distance, and the conical casing may likewise be perforated throughout or for a shorter length within the tank. Any suitable valve may be employed to close the smaller end of the casing; but I prefer a spring-pressed valve which will bear against the material and be opened thereby when the material is compressed sufficiently to force the valve off of its seat.

Any solid matter forced through the perforations in the casing will fall to the bottom of the tank, from whence it can be removed when necessary or desirable through a suitable drainage-opening 31. One trouble with compressing animal matter in the ordinary press exposed to the atmosphere is the clogging of the perforations in the press by the material which dries within and around the openings when the press is not in use. With my apparatus the perforations cannot become clogged, as it is continually kept under water, where it cannot dry. Another advantage of my method of extracting the oil is that if the material, particularly fish, is more or less decomposed and in a watery state the heating and gradual pressing under water liberates the oil in the manner described, and any material forced through the openings will fall to the bottom, while the oil from such material will float to the top, whereas when the material is first cooked and then placed in an ordinary press the oil cannot be recovered, as the material in its decomposed and semifluid state cannot be compressed, but will be forced through the openings. With this apparatus it will be seen that the extraction of the oil by gradual compression and heat under water may be carried to completion without rehandling and that the material is delivered from the apparatus in a compact mass containing only a moderate amount of water.

Having described my invention, what I claim, and desire to secure by Letters Patent of the United States, is—

1. In an apparatus of the class described, the combination with a tank adapted to contain a heated liquid, of means for continuously passing the material to be treated through the heated liquid in said tank and simultaneously applying pressure to said material, for the purpose set forth.

2. In an apparatus for extracting oil, the combination with a tank adapted to contain a heated liquid of means for passing the oil-containing material in a continuous mass through the heated liquid and simultaneously applying pressure to said material to separate the oil therefrom.

3. In an apparatus for extracting oil, the combination with a tank adapted to contain a heated liquid, of means for passing the material from which the oil is to be extracted through the liquid and for applying gradually-increasing pressure to the material as it passes through the liquid.

4. In an apparatus for extracting oil, the combination with a tank adapted to contain a heated liquid, of means for passing the material from which the oil is to be extracted through the liquid and for applying gradually-increasing pressure to the material as it passes through the liquid, and means for injecting steam into the interior of the mass of material while in the liquid.

5. In an apparatus for extracting oil, the combination with a tank adapted to contain a heated liquid, of means for passing the material from which the oil is to be extracted through the liquid under gradually-increasing pressure and forcing the material in a compressed state from the liquid.

6. In an apparatus for extracting oil, the combination with a tank adapted to contain a heated liquid, of a conveyer-press arranged beneath the liquid and comprising a tapering perforated casing, the smaller end of which opens outwardly through the end of the tank, and a rotatable screw conveyer arranged within said casing, and means for feeding the material through which the oil is to be extracted into the larger end of said conveyer-press casing.

7. In an apparatus for extracting oil, the combination with a tank adapted to contain a heated liquid, of a conveyer-press arranged beneath the liquid and comprising a tapering perforated casing the smaller end of which opens outwardly through the tank and a rotatable tapering screw conveyer arranged within said casing, a valve adapted to close the smaller end of the casing, and means for feeding the material from which the oil is to be extracted into the larger end of the casing.

8. In an apparatus for extracting oil, the combination with a tank adapted to contain a heated liquid, of a conveyer-press arranged beneath the liquid and comprising a tapering perforated casing the smaller end of which opens outwardly through the tank and a rotatable tapering screw conveyer arranged within said casing, a spring-pressed valve adapted to close the smaller end of the casing, and means for feeding the material from which the oil is to be extracted into the larger end of the casing.

9. In an apparatus for extracting oil, the combination with a tank adapted to contain a liquid, of a conveyer-press arranged beneath the liquid and comprising a tapering perforated casing the smaller end of which opens outwardly through the tank, a hollow perforated shaft extending longitudinally through said casing and a tapering screw conveyer upon said shaft, a spring-pressed valve adapted to close the smaller end of the casing, and means for feeding the material from which the oil is to be extracted into the larger end of the casing.

In testimony whereof I affix my signature in presence of two witnesses.

CHARLES WACKER.

Witnesses:
ROBERT WATSON,
C. ROLLINS ROGERS.